Oct. 24, 1944.   L. S. BARKSDALE   2,360,839
SHUTTLE VALVE
Filed May 22, 1943
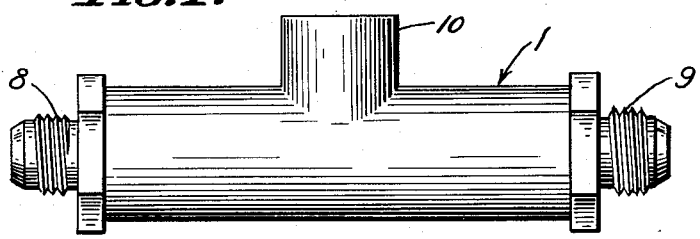
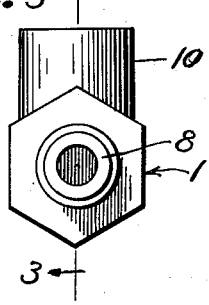
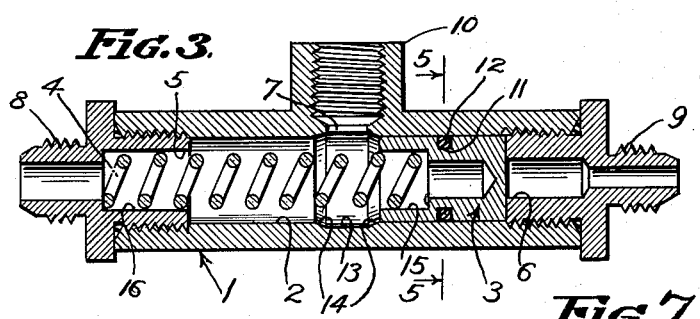
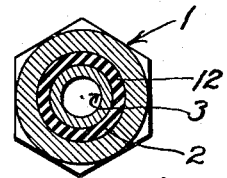
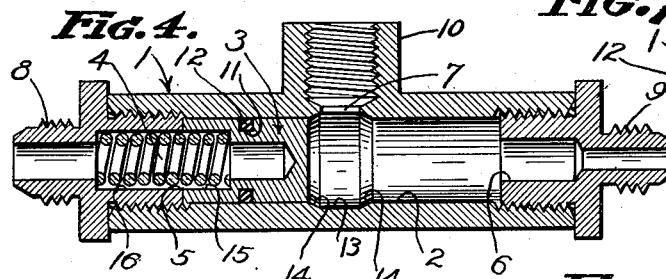
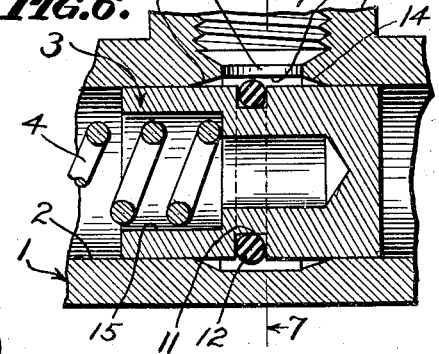
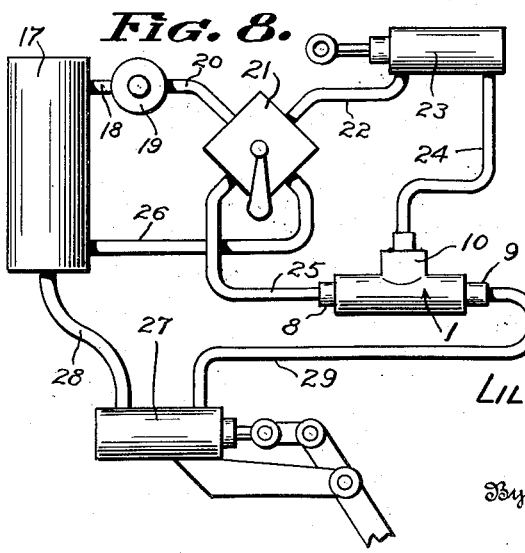
Inventor
LILBURN S. BARKSDALE
By R. S. Berry
Attorney Patented Oct. 24, 1944

2,360,839

UNITED STATES PATENT OFFICE 2,360,839

SHUTTLE VALVE

Lilburn S. Barksdale, Burbank, Calif., assignor to Adel Precision Products Corp., a corporation of California Application May 22, 1943, Serial No. 488,307

2 Claims. (Cl. 251—118)

This invention relates to shuttle valves for controlling hydraulic systems particularly in aircraft wherein such a system includes a power operated pump and an emergency pump, with the shuttle valve operating responsive to the actuation of the emergency pump to render the system fully responsive thereto so that in the event of failure of the power operated pump, the system is subject to immediate operation by means of the emergency pump.

It has been the practice in the art to which the present invention relates to provide in a shuttle valve such as above described, a spring-loaded detent means for cooperation with grooves and cam surfaces on the piston-valve which controls the flow of fluid. This detent means operates to releasably hold the piston valve in its two operative positions, with the result that if the valve is in position shutting off the power operated pump and cutting in the emergency pump, it will remain in such position upon cessation of operation of the emergency pump and until the power pump is operated to shift the piston valve into position for operating the system by means of the power operated pump. Moreover, it has been the practice to provide dual outlet ports at axially spaced points in the bore for the piston valve and controlled by said piston, said ports leading into a single outlet fitting.

One of the objects of my invention is to provide a shuttle valve of the character described in which a double-acting spring-loaded piston valve for controlling the flow from the power operated pump and the emergency pump will return to its normal position shutting out the emergency pump and connecting the power operated pump in the system, upon cessation of operation of the emergency pump thereby assuring that the system will be immediately responsive to the power operated pump while the latter is in working condition and at the same time rendering the system subject to operation by means of the emergency pump in case of failure of the power operated pump inasmuch as said valve will be moved from said normal position into position cutting out the power pump and cutting in the emergency pump upon actuation of the latter.

Another object of my invention is to provide a shuttle valve such as described in which the spring loaded detents and the cams and grooves on the piston valve as heretofore employed are eliminated in favor of a simple spring affording, in addition to appreciable reduction in manufacturing costs of the unit, a new and advantageous mode of operation in which the piston valve is normally held by the spring in position connecting the power operated pump in the system and is returned to such position by the spring thereby assuring a quicker response and a more reliable operation of the system in which the shuttle valve is employed.

Another object of my invention is to provide a shuttle valve of the character described in which the valve housing has a single outlet port intermediate two intake ports and wherein the piston valve is moved entirely past the outlet port into positions lying between the outlet port and the inlet ports when shutting off or closing the latter thereby simplifying the construction of the valve housing as well as the piston valve and reducing the cost thereof.

A further object of my invention is to provide a shuttle valve of the character described which embodies improvements over similar valves heretofore used, in point of an appreciable reduction of the number of parts and elements and machining operations, reduction of weight and of manufacturing costs, a simplification of construction, a quicker response and a more reliable performance.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a side elevation of a shuttle valve embodying my invention;

Fig. 2 is an end elevation of the valve;

Fig. 3 is a sectional view taken on the line 3—3 of Fig. 2 with the piston valve in normal position for connecting the power operated pump in a hydraulic system;

Fig. 4 is a sectional view similar to Fig. 3 showing the piston valve in position for connecting an emergency pump in the system;

Fig. 5 is a cross sectional view taken on the line 5—5 of Fig. 3;

Fig. 6 is an enlarged fragmentary longitudinal section of the unit showing the valve as when moving past the outlet port;

Fig. 7 is a cross sectional view taken on the line 7—7 of Fig. 6;

Fig. 8 is a diagrammatic view of a hydraulic system embodying my invention.

One embodiment of my invention includes a cylindrical housing 1 having a uniform diameter bore 2 extending therethrough and containing a piston valve 3 normally held in one of its two operative positions by means of a spring 4 interposed between an end of the bore 2 and one end of the piston valve. This housing is provided with intake ports 5 and 6 at its ends and an outlet port 7 between its ends, said port being arranged so that the piston valve in its normal position is disposed in entirety between the outlet port 7 and the intake port 6 so as to close the latter and open the port 5 for communication with the outlet port 7 as shown in Fig. 3. In its other position the piston valve 3 is disposed in entirety between the intake port 5 and the outlet port 7 so as to close the intake port 5 and allow the flow of fluid from port 6 to the outlet port 7 as shown in Fig. 4.

It should be noted that in being shifted from one to the other of its two positions the piston valve moves entirely past the outlet port 7, fully opening said port and one intake port in each of said two positions.

As here shown the intake ports 5 and 6 are provided at the inner ends of fittings 8 and 9 screwed into the ends of the bore 2, whereas the outlet port 7 opens into a nipple 10 formed integral with the housing 1.

The piston valve 3 is provided with a circumferential groove 11 in which a packing ring 12 of circular cross section is mounted. The portion of the bore 2 which is intersected by the port 7 is circumferentially enlarged as at 13 and the edges of this enlarged portion are oppositely beveled as at 14 so that as shown in Fig. 6 the packing ring 12 will clear the enlarged end beveled portions when the piston valve is moved past the port 7 thereby preventing injury and distortion of said ring and allowing a free reciprocable movement of the piston valve. The ring 12 has a sealing fit with the portions of the bore on opposite sides of the enlargement 13.

A socket 15 is formed at one end of the piston valve and receives one end of the spring while the other end of the spring engages in a counter- A system to which my improved shuttle valve is adaptable is shown in Fig. 8, this system being employed for extending and retracting the landing gear of airplanes. Such a system includes a reservoir 17, a line 18 leading therefrom to a motor operated hydraulic pump 19, a line 20 leading from the pump to a 4-way control valve 21, a line 22 leading from the valve 21 to one end of a hydraulic cylinder 23, a line 24 leading from the other end of the cylinder to the outlet nipple 10 of the housing 1 of my shuttle valve, a line 25 leading from the fitting 8 of the shuttle valve back to the 4-way valve and a return line 26 leading from the 4-way valve to the reservoir, thus completing a circuit in which the cylinder is selectively actuated by the motor driven pump.

In order that the cylinder may be actuated by means of the hand pump 27, a line 28 leads to said hand pump from the reservoir and a line 29 leads from said hand pump to the fitting 9 of the shuttle valve.

Normally the spring 4 holds the piston valve 3 in the position shown in Fig. 3 so that the port 7 is open to communication with the port 5 through the bore 2, the port 6 being then closed by the piston valve. This will connect the power operated pump 19 in the system, which now operates in the usual manner under control of the 4-way control valve. Should the power-operated pump fail or it becomes necessary to operate the emergency pump, immediately upon the manual operation of the latter the pressure fluid will move the piston valve 3 from the position shown in Fig. 3 to the position shown in Fig. 4 thereby opening the port 6 for communication with the port 7, while the intake port 5 is closed. Pressure fluid from the hand pump now passes through intake port 6, bore 2 and the port 7 to the cylinder 23 for operating the latter to extend the landing gear, not shown. Upon cessation of operation of the emergency pump, the spring 4 immediately acts to return the piston valve 3 to the position shown in Fig. 3 in which the emergency pump is cut out of the system and the power operated pump is connected in the system.

It should be noted that the valve of my invention makes it possible to use a simple form of valve housing in which a straight uniform diameter bore extends therethrough and wherein but three ports are necessary, namely, ports 5, 6, and 7. This arrangement makes for a reduction in the size and weight of the housing as well as in the cost thereof.

The simple form of piston valve normally held in position by means of the spring 4 to connect the power operated pump in the system and having a sealing ring of circular cross section between its ends, makes it unnecessary to machine cam surfaces and grooves in the piston valve, to use a spring loaded detent to hold the valve in its operative positions or to lap in seats for the piston valve or provide especially designed and machined valve ends on the piston valve.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a shuttle valve, a housing having a cylindrical bore extending therethrough, pressure fluid intake ports at the ends of said bore, and a pressure fluid outlet port between the ends of said bores, said bore being enlarged at least at the side thereof where it is intersected by said outlet port, a piston valve reciprocable in said bore responsive to pressure fluid entering from either intake port so that when said piston valve is in one position, one intake port will be closed and the other intake port and the outlet port will be open; and in another position of said piston valve said other intake port will be closed and said one intake port and said outlet port will be open, a spring interposed between one end of the bore and one end of the piston valve for normally holding the latter in position closing one of the intake ports, and a packing ring on the piston valve arranged to have a sealing fit with the portions of the bore on opposite sides of said enlargement of the bore and moving past said enlargement when the piston valve is shifted into positions for closing said intake ports, the edge portions of said enlargement being beveled to prevent injurious contact of said packing ring with them.

2. In a shuttle valve, a housing having a cylindrical bore extending therethrough, pressure fluid intake ports at the ends of said bore, and a pressure fluid outlet port between the ends of said bores, said bore being circumferentially enlarged at a point where intersected by said outlet port, a piston valve reciprocable in said bore responsive to pressure fluid entering from either intake port so that when said piston valve is in one position, one intake port will be closed and the other intake port and the outlet port will be open; and in another position of said piston valve said other intake port will be closed and said one intake port and said outlet port will be open; a spring interposed between one end of the bore and one end of the piston valve for normally holding the latter in position closing one of the intake ports, and a packing ring on the piston valve arranged to have a sealing fit with the portions of the bore on opposite sides of said enlargement of the bore and moving past said enlargement when the piston valve is shifted into positions for closing said intake ports, said enlarged portion of the bore having the edges thereof beveled in opposite directions so that injurious contact of said packing ring therewith is avoided during the shifting of the piston valve.

LILBURN S. BARKSDALE.